May 5, 1959
J. E. HOLT
2,884,771
SPEEDOMETER CABLE
Filed March 9, 1956
2 Sheets-Sheet 1
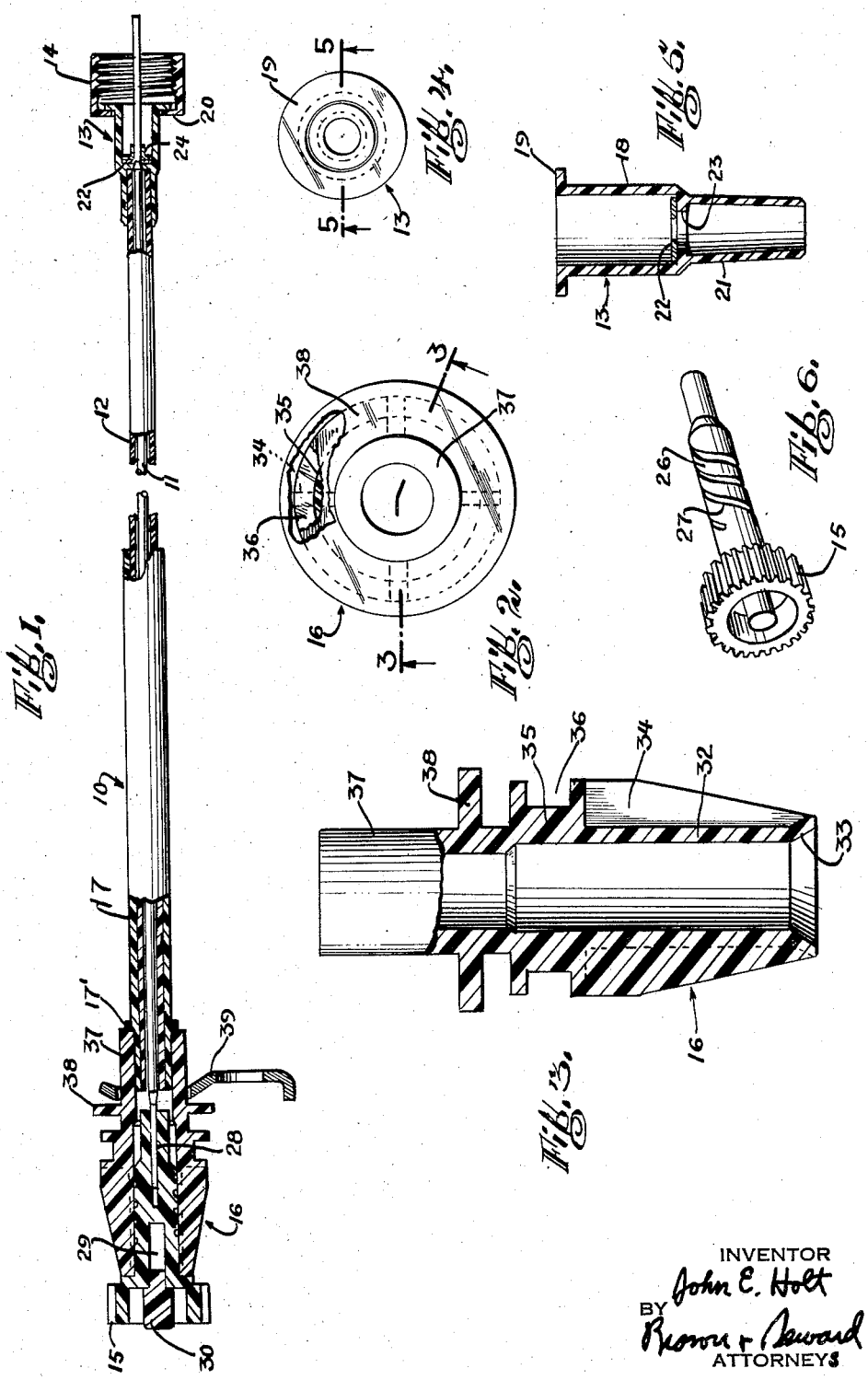
INVENTOR
John E. Holt
BY
Brown + Seward
ATTORNEYS

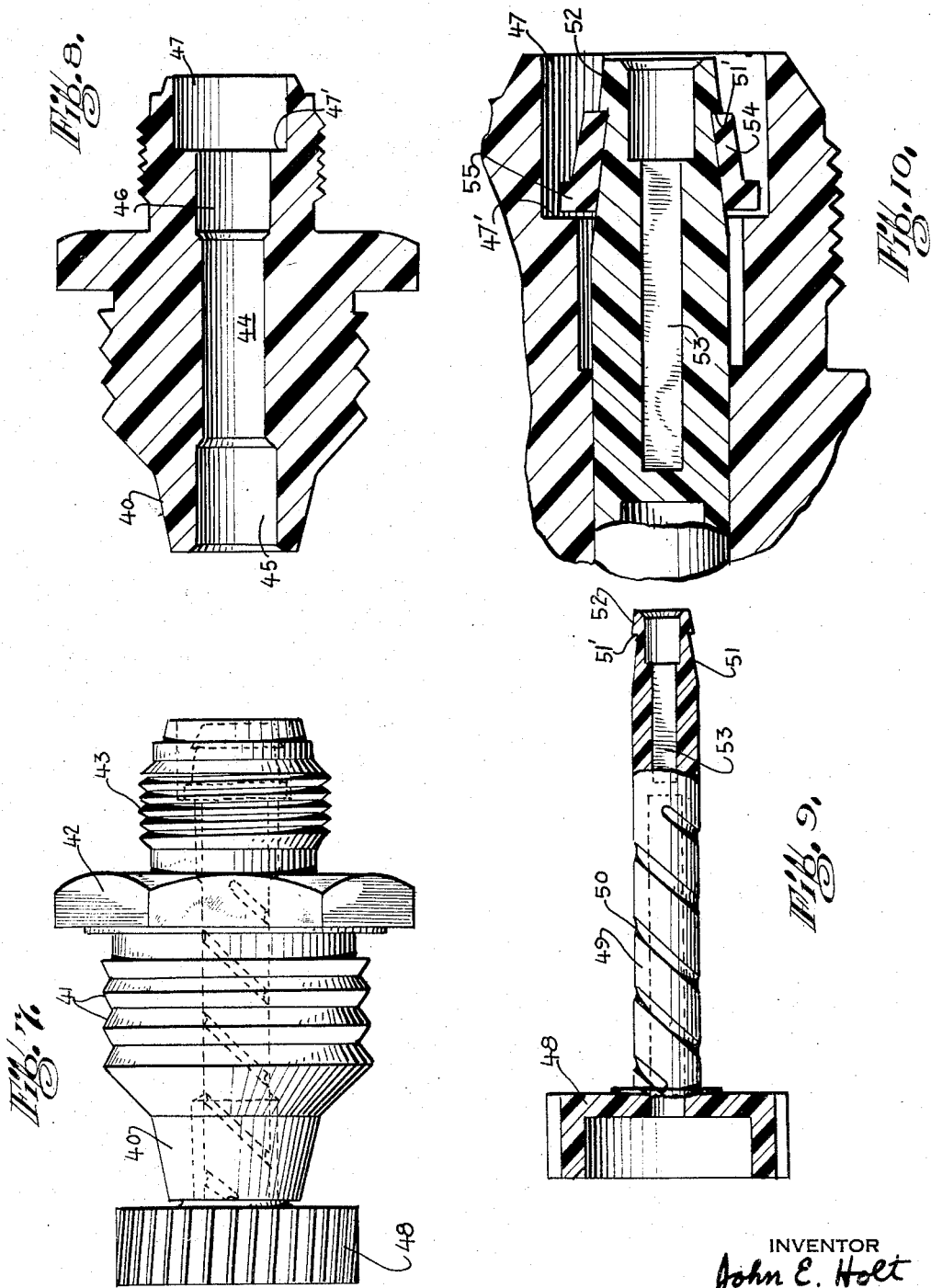

2,884,771

SPEEDOMETER CABLE

John E. Holt, Hampton, Conn., assignor, by mesne assignments, to The Danielson Manufacturing Company, Danielson, Conn., a corporation of Rhode Island Application March 9, 1956, Serial No. 570,472

5 Claims. (Cl. 64—4)

The present invention relates to a speedometer cable, and particularly to such cables and their fittings for use in automobiles.

A principal object of the invention is to provide a speedometer cable which requires little or no lubrication; which is not affected by low temperature operating conditions, and which has an exceptionally high speed ceiling.

A further object of the invention is to utilize an integrated plastic sheathing and housings for the flexible steel shaft of a speedometer cable, whereby the cable is fully protected against rocks, dirt, rain, snow and ice.

Another object of the invention is to provide a speedometer cable, opitionally, with an additional protective plastic sheathing which holds the cable in a safe bending curvature.

A further object is to provide a housing and gear combination in which the gear unit is snap-locked in place, as by means of a combination retainer and thrust washer.

Another object is to provide a transmission-end housing adapted to be self-retaining in the transmission casing wherein it may have a snap or friction fit.

With the above and other objects and advantageous features which will become apparent as the description proceeds, the invention consists of a novel arrangement of parts more fully disclosed in the following description, in conjunction with the accompanying drawings, and more specifically defined in the claims appended hereto.

In the drawings,

Fig. 1 is a vertical central section through a speedometer cable construction embodying the invention, the cable including a flexible steel shaft having a gear connection at one end, a tubular sheath around the shaft (including a bend resisting reinforcement, if desired) and a speedometer connection at the other end, part of the central portion being omitted;

Fig. 2 is an enlarged end view of the gear connection, without the cable and take-off gear;

Fig. 3 is a section on the line 3—3 of Fig. 2;

Fig. 4 is an enlarged end view of the speedometer connection;

Fig. 5 is a section on the line 5—5 of Fig. 4;

Fig. 6 is a perspective view of the take-off gear;

Fig. 7 is a side elevational view of an alternative form of transmission-end housing with the take-off gear in working position;

Fig. 8 is an axial section through the housing shown in Fig. 7;

Fig. 9 is an axial section, partly in elevation, through the take-off gear shown in Fig. 7; and Fig. 10 is a detail axial section, on an enlarged scale with parts broken away, showing how the gear is retained in the housing by means of a snap-locking retainer which acts also as a thrust washer.

The speedometer cables presently used include a sheathed flexible steel shaft or core, a threaded housing at one end adapted for mounting on the speedometer register case with the shaft end suitably connected to the register mechanism, and a housing connection at the other end in which is journaled the speedometer take-off gear and which is designed to be mounted in an opening in the gear case. It has been found that a flexible wound sheathing may not be proof against infiltration of dust, rain and snow, that the shaft and its sheath must be lubricated to ensure free rotation of the shaft, with the possibility that the lubricant may become hard or that moisture may freeze under low temperature conditions, and that the speedometer cable may be inadvertently bent at too sharp an angle, particularly near its lower end, each of which difficulties tends to impose an excessive strain on the cable.

In order to overcome these difficulties the cable construction disclosed herein includes a plastic sheath for the steel wire shaft, a plastic threaded fitting at the speedometer register case end and a plastic housing connection at the transmission end, the sheath, fitting and housing connection being cemented and/or locked together and serving to maintain the cable free of rocks, dust, rain and snow, while requiring no lubrication, or very little lubrication under certain operating conditions, and being able to be readily strengthened at attaching points so that too sharp bending is prevented. A polyamide resin such as nylon is particularly suitable as the plastic material, since nylon is a self-lubricating material which may be run dry or may be very lightly lubricated with a light oil, as preferred.

Referring to the drawings, the speedometer cable 10 includes a flexible steel shaft 11, a tubular plastic sheath 12 around the shaft intermediate the ends, a plastic terminal housing 13 at the register end of the shaft having its outwardly flanged end seated in a threaded flanged metal or nylon "nut" 14, a plastic gear 15 at the gear casing end of the shaft, and a plastic housing connection 16. A reinforcing plastic sheath 17 may be positioned around the sheath 12 at the gear casing end.

The sheath 12 (Fig. 1) is of tubular plastic, preferably nylon, and surrounds the central portion of the flexible steel shaft 11, with a free clearance. The housing 13 (Figs. 4 and 5) is preferably of nylon, and includes an upper cylindrical shell 18 wtih a lateral annular flange 19 which seats within flange 20 of the nut 14, and a sheath gripping portion 21 of reduced diameter to tightly grip the contiguous portion of sheath 12, whereby the housing and the sheath may be cemented together. The housing is shown as having a small flange 23 between the shell 18 and the sheath gripping portion 21 which serves as a seat for a thrust collar 24 mounted on the shaft 11, as illustrated in Fig. 1. A thrust washer 22, preferably of nylon, may be interposed between the flange 23 and collar 24 if desired.

The gear 15 (Fig. 6) is also preferably of nylon, and is integral with a cylindrical stem 26 having an oil grooving 27 of helical form which may be so disposed with respect to the normal forward driving motion of the gear that it will tend to pump oil back into the gear casing, the stem 26 having an axial bore 28 for receiving the gear casing end of the flexible shaft 11. Said shaft end is normally non-circular in section (e.g., square) and the bore 28 should be correspondingly shaped and of a size to fit tightly on said shaft end. The gear 15 has an outer axial bore 29 closed by a thrust plug 30, designed to rest against a suitable stop inside the gear box when the cable is installed in operative position. This bore and plug construction has certain manufacturing advantages (saving of material, ease of molding) over a one-piece construction in situations where a stop can conveniently be provided.

The housing connection 16 (Fig. 3) is preferably of nylon and includes a body 31, a lower tubular portion 32 with an outwardly flared mouth 33, and outer axial ribs 34 which taper downwardly to facilitate insertion of the unit into the gear casing. The body 31 has an intermediate portion 35 with an annular outer recess 36 adapted to receive an oil sealing ring (not shown), and an upper tubular portion 37 which has a reduced internal diameter and a laterally extending flange 38 which seats in the gear casing opening. The housing connection 16 may be held firmly in place, if necessary, by means of a metal clamp 39, shaped to grip the connection 16 adjacent the flange 38 and provided with a bolt hole whereby it may be secured to the gear casing by means of a single bolt.

The reinforcing tubular sheath 17, when used, seats within the tubular portion 37 and fits tightly over the sheath 12; it is also preferably of nylon and has a stop collar 17' as illustrated, the contacting parts of the housing, the sheath 12 and the reinforcing sheath 17 being cemented together. The sheath 12 is thus anchored at each end, either by cementing, as described, or by interlocking engagement.

It is thus clear that the speedometer drive shaft is completely encased in a plastic covering, preferably of nylon, which rocks, dust, dirt, rain or snow cannot penetrate, that the covering is self-lubricating, being made of nylon, and that no lubrication, or at most very little lubrication, is required. Furthermore, a reinforcing sheath can be used on the lower and more exposed part of the cable to prevent damage by flying rocks and also to stiffen the cable against too sharp a bending of the shaft, thus preventing the application of breaking strains thereto; the elimination of oil and moisture prevents impairment of operation due to thickening of the oil or freezing of moisture, either of which can cause increased resistance to rotation.

In the alternative form shown in Figs. 7 to 10 the transmission end housing comprises a frusto-conic inner end portion 40, a generally cylindrical portion 41 which may be provided with a series of circumferentially disposed ribs as shown, a hexagonal portion 42 resembling a bolt head with a minimum diameter greater than that of the portion 41, and a smaller threaded cylindrical outer portion 43. The housing is provided with an axial bore 44 having an enlarged inner end zone 45 and an enlarged outer end zone 46, the outer end being further enlarged to form the annular recess 47 bounded axially inwardly by the flat annular shoulder 47'.

The take-off gear 48 is formed integrally with the elongated cylindrical stem 49, the interior of the gear pinion itself and the adjacent end of the stem being recessed as shown, for economy of material and ease of molding. The stem is provided with a helical groove 50 (corresponding to the groove 27, Figs 1 and 6) so disposed as to tend to feed oil into the gear box under normal operating conditions. The stem is of a diameter such that it fits in the bore 44 with a reasonably close tolerance—preferably no more than a few thousandths of an inch—but permitting free and relatively frictionless rotation at all possible speeds and under all conditions. Near its outer end the stem 49 is tapered at 51 toward an inwardly facing annular shoulder 51', the remaining short end part of the stem being of a somewhat reduced diameter and preferably also being tapered as indicated at 52. The outer end of the stem is also provided with a non-circular bore 53 corresponding to the bore 28 of Fig. 1.

The generally frusto-conic retainer and thrust washer 54 has a maximum internal diameter greater than the minimum diameter of the tapered end 52 of the stem, and a minimum internal diameter approximately equal to the minimum diameter of the tapered area 51 adjacent the shoulder 51'. At its larger end the retainer is radially diameter such that it may bear against the shoulder 47' to constitute a thrust washer.

The housing just described is intended to be used with a cable end having a nut such as that shown at 14 in Fig. 1, and the assembling operation comprises passing the gear stem through the housing, pushing the squared end of the steel drive shaft into the bore 53, forcing the retainer in an axial direction over the tapered end of the stem until it passes the shoulder 51' and snaps into place around the tapered area 51, and then screwing a nut (not shown, similar to 14) onto the threaded portion 43 of the housing. Said housing may then be installed in an opening in the transmission casing, either with a driving fit, relying on the ribs on the portion 41 to hold it securely in place, or with the aid of a clamp 39 as in the case of the form shown in Figs. 1 to 7, or the "ribs" may be replaced by molded screw threads matching threads in the casing opening. When assembled, the distance from the collar 55 to the gear 48 is only slightly greater than the distance from shoulder 47' to the opposite end of the housing, so that axial play of the gear, stem and shaft with respect to the housing is kept within desired limits. The recess 47 is of such a size that the snap-locked end of the gear stem is accessible for removal of the retainer, if necessary, upon unscrewing the nut.

The take-off gears 15 and 48 are designed to be mounted for continuous engagement with a worm (not shown) which is fixed on some suitable shaft or the like in the transmission, ensuring operation of the speedometer in synchronism with rotation of the wheels. However, it will be understood that the structure described herein as a "speedometer cable," and the several parts thereof, can readily be used or adapted for use in the driving of devices other than a speedometer, e.g., a tachometer, a pump, etc., and the description is not to be regarded as restrictive in this respect except as restriction may be clearly implied or required.

Suitable methods and apparatus for molding a helical gear with an integrally formed grooved shaft are disclosed and claimed in Holt Patent No. 2,789,311, issued April 23, 1957, the gear, shaft and retainer shown in Figs. 9 and 10 of the present application being shown also in Figs. 9 to 12 of said patent.

Although specific structures embodying the invention have been shown and described, it is obvious that changes in the size, shape and arrangement of the parts may be made to meet different requirements without departing from the spirit and scope of the invention as defined in the appended claims.

I claim:

1. A speedometer cable assembly comprising, a flexible steel shaft adapted to be rotated, a tubular sheath of plastic material encasing the shaft, housings, of plastic material secured to each end of the sheath, the ends of the shaft and the ends of the sheath extending into said housings, a gear of plastic material having teeth disposed to form a worm wheel and an integrally formed, axially elongated stem designed to fit rotatably into one of said housings and to engage non-rotatably the corresponding end of the drive shaft, and means for restricting axial movement of said gear.

2. A speedometer cable assembly according to claim 1 in which the means for restricting axial movement of the gear comprises a thrust plug mounted on the axis of the gear adjacent to the worm wheel.

3. A speedometer cable assembly according to claim 1 in which the means for restricting axial movement of the gear comprises a plastic retaining sleeve snap-locked on the stem at a distance from the worm wheel.

4. In a flexible cable construction, a housing connection of plastic material comprising, a tubular portion at one end having a cylindrical bore adapted to receive a gear stem for rotation therein, a tubular portion at the other end, and a laterally outwardly extending flange, the said gear stem receiving tubular portion having longitudinal fins tapering downwardly towards the outer ends thereof.

5. A cable construction according to claim 4 in which the second said tubular portion has a cylindrical bore which is of substantially larger diameter than that of the first named cylindrical bore and is bounded inwardly by an annular wall lying in a plane perpendicular to the axis of said bores.

References Cited in the file of this patent

UNITED STATES PATENTS

| | | |
|---|---|---|
| 59,064 | Potter | Oct. 23, 1866 |
| 1,262,316 | Farnsworth | Apr. 9, 1918 |
| 1,324,787 | Berge | Dec. 16, 1919 |
| 1,791,847 | Smith | Feb. 10, 1931 |
| 2,347,580 | Stearns | Apr. 25, 1944 |
| 2,679,061 | Baker | May 25, 1954 |
| 2,699,656 | Anderson | Jan. 18, 1955 |
| 2,782,020 | McCandless | Feb. 19, 1957 |